United States Patent
Kern et al.

(10) Patent No.: US 8,793,313 B2
(45) Date of Patent: *Jul. 29, 2014

(54) SYSTEMS, METHODS AND MEDIA FOR DISTRIBUTING PEER-TO-PEER COMMUNICATIONS

(75) Inventors: Mark Kern, Aliso Viejo, CA (US); Sean Culhane, Richmond Hill (CA); Don Hoffman, Portland, OR (US)

(73) Assignee: Red 5 Studios, Inc., Laguna Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/228,285

(22) Filed: Sep. 8, 2011

(65) Prior Publication Data

US 2013/0067088 A1     Mar. 14, 2013

(51) Int. Cl.
| | |
|---|---|
| G06F 15/16 | (2006.01) |
| G06F 9/00 | (2006.01) |
| H04L 29/08 | (2006.01) |
| H04L 29/12 | (2006.01) |
| G06F 11/20 | (2006.01) |

(52) U.S. Cl.
CPC .......... *H04L 67/104* (2013.01); *H04L 61/2539* (2013.01); *H04L 67/1031* (2013.01); *G06F 11/2028* (2013.01)
USPC ........... 709/204; 709/205; 709/218; 709/249; 726/12; 726/15

(58) Field of Classification Search
CPC . H04L 61/2539; H04L 67/104; H04L 67/101; G06F 11/2028; G06F 11/2025; G06F 11/2023
USPC ............... 709/223–227, 217–219; 726/15, 12
See application file for complete search history.

(56) References Cited

U.S. PATENT DOCUMENTS

| | | | |
|---|---|---|---|
| 5,371,852 A | 12/1994 | Attanasio et al. | |
| 5,384,910 A | 1/1995 | Torres | |
| 5,943,052 A | 8/1999 | Allen et al. | |
| 6,067,545 A * | 5/2000 | Wolff .................................... | 1/1 |
| 6,330,605 B1 | 12/2001 | Christensen et al. | |

(Continued)

FOREIGN PATENT DOCUMENTS

| | | |
|---|---|---|
| CN | 102385479 | 3/2012 |
| CN | 102681839 | 9/2012 |

(Continued)

OTHER PUBLICATIONS

Zhou et al., "A Method of View-Frustum Culling with OBB Based on Octree," IET Conference on Wireless, Mobile and Sensor Networks 2007, pp. 680-682, Jan. 1, 2007. XP55023509.

(Continued)

*Primary Examiner* — Joseph E. Avellino
*Assistant Examiner* — Aftab Nasir Khan
(74) *Attorney, Agent, or Firm* — Carr & Ferrell LLP

(57) ABSTRACT

Systems and methods for distributing peer-to-peer communications are provided herein. Exemplary methods may include masking identification of two or more client nodes on a communications channel of a peer-to-peer communications network by directing peer-to-peer communications of the two or more client nodes through a proxy node, the proxy node including a disinterested client node relative to the two or more client nodes, the disinterested client node providing network resources to the peer-to-peer communications network.

14 Claims, 4 Drawing Sheets

(56) References Cited

U.S. PATENT DOCUMENTS

| | | | |
|---|---|---|---|
| 6,374,336 B1 | 4/2002 | Peters et al. | |
| 6,380,933 B1 | 4/2002 | Sharir et al. | |
| 6,434,398 B1 | 8/2002 | Inselberg | |
| 6,456,304 B1 | 9/2002 | Angiulo et al. | |
| 6,466,275 B1 | 10/2002 | Honey et al. | |
| 6,526,448 B1 | 2/2003 | Blewett | |
| 6,561,811 B2 | 5/2003 | Rapoza et al. | |
| 6,571,216 B1 | 5/2003 | Garg et al. | |
| 6,597,375 B1 | 7/2003 | Yawitz | |
| 6,629,129 B1 | 9/2003 | Bookspan et al. | |
| 6,699,127 B1 | 3/2004 | Lobb et al. | |
| 6,760,042 B2 | 7/2004 | Zetts | |
| 6,760,595 B2 | 7/2004 | Inselberg | |
| 6,772,195 B1 | 8/2004 | Hatlelid et al. | |
| 6,864,886 B1 | 3/2005 | Cavallaro et al. | |
| 6,928,485 B1 | 8/2005 | Krishnamurthy et al. | |
| 6,996,413 B2 | 2/2006 | Inselberg | |
| 6,999,083 B2 | 2/2006 | Wong et al. | |
| 7,075,556 B1 | 7/2006 | Meier et al. | |
| 7,133,051 B2 | 11/2006 | Sloo et al. | |
| 7,219,160 B1* | 5/2007 | Buchsbaum et al. | 709/242 |
| 7,350,158 B2 | 3/2008 | Yamaguchi et al. | |
| 7,390,254 B2 | 6/2008 | Hirai | |
| 7,458,894 B2 | 12/2008 | Danieli et al. | |
| 7,490,314 B2 | 2/2009 | Yuknewicz et al. | |
| 7,492,363 B2 | 2/2009 | Meier et al. | |
| 7,506,318 B1 | 3/2009 | Lindo et al. | |
| 7,509,390 B1 | 3/2009 | Raman et al. | |
| 7,632,186 B2 | 12/2009 | Spanton et al. | |
| 7,719,971 B1 | 5/2010 | Issa | |
| 7,729,992 B2 | 6/2010 | Rose | |
| 7,824,268 B2 | 11/2010 | Harvey et al. | |
| 7,827,560 B2 | 11/2010 | Bayer | |
| 7,844,301 B2 | 11/2010 | Lee et al. | |
| 7,890,701 B2 | 2/2011 | Lowery et al. | |
| 7,917,632 B2 | 3/2011 | Lee et al. | |
| 7,970,820 B1 | 6/2011 | Sivasubramanian et al. | |
| 8,001,063 B2 | 8/2011 | Tesauro et al. | |
| 8,025,569 B2 | 9/2011 | Nguyen et al. | |
| 8,025,572 B2 | 9/2011 | Spanton et al. | |
| 8,128,469 B2 | 3/2012 | Hormigo Cebolla et al. | |
| 8,128,503 B1 | 3/2012 | Haot et al. | |
| 8,130,747 B2 | 3/2012 | Li et al. | |
| 8,235,817 B2 | 8/2012 | Zalewski | |
| 8,475,284 B1 | 7/2013 | Rudi et al. | |
| 8,478,767 B2 | 7/2013 | Kern et al. | |
| 8,572,180 B2 | 10/2013 | Kern et al. | |
| 8,589,423 B2 | 11/2013 | Kern et al. | |
| 8,628,424 B1 | 1/2014 | Kern et al. | |
| 2001/0036356 A1 | 11/2001 | Weaver et al. | |
| 2001/0055991 A1 | 12/2001 | Hightower | |
| 2002/0002074 A1 | 1/2002 | White et al. | |
| 2002/0032056 A1 | 3/2002 | Oh | |
| 2002/0097984 A1 | 7/2002 | Abecassis | |
| 2002/0183115 A1 | 12/2002 | Takahashi et al. | |
| 2002/0198769 A1 | 12/2002 | Ratcliff, III | |
| 2003/0038805 A1 | 2/2003 | Wong et al. | |
| 2003/0084462 A1 | 5/2003 | Kubota et al. | |
| 2003/0220143 A1 | 11/2003 | Shteyn et al. | |
| 2004/0087363 A1 | 5/2004 | Bogenn | |
| 2004/0116183 A1 | 6/2004 | Prindle | |
| 2004/0153569 A1 | 8/2004 | Savathphoune | |
| 2004/0192354 A1 | 9/2004 | Sawano | |
| 2004/0248631 A1 | 12/2004 | Hirai | |
| 2004/0259627 A1 | 12/2004 | Walker et al. | |
| 2005/0020359 A1 | 1/2005 | Ackley et al. | |
| 2005/0071736 A1 | 3/2005 | Schneider et al. | |
| 2005/0091597 A1 | 4/2005 | Ackley | |
| 2005/0227771 A1 | 10/2005 | Nelson et al. | |
| 2006/0058103 A1 | 3/2006 | Danieli et al. | |
| 2006/0098013 A1 | 5/2006 | Wong et al. | |
| 2006/0170778 A1 | 8/2006 | Ely et al. | |
| 2006/0179147 A1 | 8/2006 | Tran et al. | |
| 2006/0206565 A1 | 9/2006 | Ganesan et al. | |
| 2006/0258446 A1 | 11/2006 | Nguyen et al. | |
| 2007/0055694 A1 | 3/2007 | Ruge et al. | |
| 2007/0063995 A1 | 3/2007 | Bailey et al. | |
| 2007/0117617 A1 | 5/2007 | Spanton et al. | |
| 2007/0117635 A1 | 5/2007 | Spanton et al. | |
| 2007/0250901 A1 | 10/2007 | McIntire et al. | |
| 2007/0256030 A1 | 11/2007 | Bedingfield, Sr. | |
| 2007/0298878 A1 | 12/2007 | Short | |
| 2008/0026839 A1 | 1/2008 | Alringer | |
| 2008/0052384 A1* | 2/2008 | Marl et al. | 709/223 |
| 2008/0071907 A1 | 3/2008 | Thompson | |
| 2008/0119286 A1 | 5/2008 | Brunstetter et al. | |
| 2008/0125226 A1 | 5/2008 | Emmerson | |
| 2008/0126357 A1 | 5/2008 | Casanova et al. | |
| 2008/0146339 A1 | 6/2008 | Olsen et al. | |
| 2008/0146342 A1 | 6/2008 | Harvey et al. | |
| 2008/0196098 A1 | 8/2008 | Cottrell et al. | |
| 2009/0005196 A1 | 1/2009 | Kessler et al. | |
| 2009/0017750 A1 | 1/2009 | Marcinkiewicz | |
| 2009/0031227 A1 | 1/2009 | Chakrabarti et al. | |
| 2009/0044113 A1 | 2/2009 | Jones et al. | |
| 2009/0083662 A1 | 3/2009 | Fitzmaurice et al. | |
| 2009/0083665 A1 | 3/2009 | Anttila et al. | |
| 2009/0100366 A1 | 4/2009 | Fitzmaurice et al. | |
| 2009/0118017 A1 | 5/2009 | Perlman et al. | |
| 2009/0118018 A1 | 5/2009 | Perlman et al. | |
| 2009/0118019 A1 | 5/2009 | Perlman et al. | |
| 2009/0118020 A1 | 5/2009 | Koivisto et al. | |
| 2009/0124387 A1 | 5/2009 | Perlman et al. | |
| 2009/0144380 A1 | 6/2009 | Kallman et al. | |
| 2009/0172171 A1 | 7/2009 | Amir | |
| 2009/0208181 A1 | 8/2009 | Cottrell | |
| 2009/0215531 A1 | 8/2009 | Perlman et al. | |
| 2009/0215540 A1 | 8/2009 | Perlman et al. | |
| 2009/0249189 A1 | 10/2009 | Jania et al. | |
| 2009/0254998 A1 | 10/2009 | Wilson | |
| 2009/0265473 A1* | 10/2009 | Hydrie et al. | 709/229 |
| 2009/0290753 A1 | 11/2009 | Liu et al. | |
| 2009/0297118 A1 | 12/2009 | Fink et al. | |
| 2009/0326970 A1 | 12/2009 | Estrada et al. | |
| 2010/0014825 A1 | 1/2010 | Curtis et al. | |
| 2010/0031333 A1 | 2/2010 | Mitchell et al. | |
| 2010/0041475 A1 | 2/2010 | Zalewski et al. | |
| 2010/0064008 A1 | 3/2010 | Yan et al. | |
| 2010/0100849 A1 | 4/2010 | Fram | |
| 2010/0150120 A1 | 6/2010 | Schlicht et al. | |
| 2010/0154050 A1 | 6/2010 | Mukkara et al. | |
| 2010/0167809 A1 | 7/2010 | Perlman et al. | |
| 2010/0167816 A1 | 7/2010 | Perlman et al. | |
| 2010/0169964 A1 | 7/2010 | Liu et al. | |
| 2010/0174782 A1 | 7/2010 | Rose | |
| 2010/0218104 A1 | 8/2010 | Lewis | |
| 2010/0281095 A1 | 11/2010 | Wehner et al. | |
| 2010/0281432 A1 | 11/2010 | Geisner et al. | |
| 2011/0013087 A1 | 1/2011 | House et al. | |
| 2011/0028194 A1 | 2/2011 | Tang et al. | |
| 2011/0029932 A1 | 2/2011 | McKaskle et al. | |
| 2011/0055222 A1 | 3/2011 | Choudur et al. | |
| 2011/0059818 A1 | 3/2011 | Blais et al. | |
| 2011/0093600 A1 | 4/2011 | Lee et al. | |
| 2011/0105226 A1 | 5/2011 | Perlman | |
| 2011/0111854 A1 | 5/2011 | Roberts et al. | |
| 2011/0145880 A1 | 6/2011 | Wang | |
| 2011/0151971 A1 | 6/2011 | Altshuler et al. | |
| 2011/0161666 A1 | 6/2011 | Gladwin et al. | |
| 2011/0202562 A1 | 8/2011 | Bloch et al. | |
| 2011/0238618 A1 | 9/2011 | Valdiserri et al. | |
| 2011/0263333 A1 | 10/2011 | Dokei et al. | |
| 2011/0270924 A1 | 11/2011 | Johnsson et al. | |
| 2011/0275431 A1 | 11/2011 | Hirzel et al. | |
| 2011/0295666 A1 | 12/2011 | Musial et al. | |
| 2012/0054002 A1 | 3/2012 | Rotbard et al. | |
| 2012/0054685 A1 | 3/2012 | Su et al. | |
| 2012/0130863 A1 | 5/2012 | Tedjamulia et al. | |
| 2012/0142433 A1 | 6/2012 | Perlman et al. | |
| 2012/0149476 A1 | 6/2012 | Perlman et al. | |
| 2012/0151346 A1 | 6/2012 | McClements, IV | |
| 2012/0151347 A1 | 6/2012 | McClements, IV | |
| 2012/0173312 A1 | 7/2012 | Kern | |
| 2012/0185066 A1 | 7/2012 | Kern et al. | |

(56) References Cited

U.S. PATENT DOCUMENTS

| | | |
|---|---|---|
| 2012/0204107 A1 | 8/2012 | Salinas |
| 2012/0269394 A1 | 10/2012 | Kern et al. |
| 2012/0272139 A1 | 10/2012 | Kern et al. |
| 2012/0272187 A1 | 10/2012 | Su et al. |
| 2012/0272189 A1 | 10/2012 | Su et al. |
| 2012/0311624 A1 | 12/2012 | Oskolkov et al. |
| 2013/0031148 A1 | 1/2013 | Kern et al. |
| 2013/0031149 A1 | 1/2013 | Kern et al. |
| 2013/0067091 A1 | 3/2013 | Kern et al. |
| 2013/0084970 A1 | 4/2013 | Geisner et al. |
| 2014/0004951 A1 | 1/2014 | Kern et al. |
| 2014/0018157 A1 | 1/2014 | Kern et al. |
| 2014/0018165 A1 | 1/2014 | Kern et al. |
| 2014/0024463 A1 | 1/2014 | Rudi et al. |
| 2014/0025987 A1 | 1/2014 | Kern et al. |
| 2014/0031121 A1 | 1/2014 | Kern et al. |
| 2014/0038710 A1 | 2/2014 | Rudi et al. |

FOREIGN PATENT DOCUMENTS

| | | |
|---|---|---|
| CN | 102904922 | 1/2013 |
| CN | 103002001 | 3/2013 |
| CN | 103329153 | 9/2013 |
| DE | 102005034692 | 2/2007 |
| EP | 1879381 | 1/2008 |
| EP | 2426600 | 3/2012 |
| EP | 2477130 | 7/2012 |
| EP | 2552075 | 1/2013 |
| EP | 2558996 | 2/2013 |
| EP | 2568688 | 3/2013 |
| JP | 2004362149 | 12/2004 |
| WO | WO9712342 A1 | 4/1997 |
| WO | WO2006076075 | 7/2006 |
| WO | WO2012094269 | 7/2012 |

OTHER PUBLICATIONS

World of Warcraft Gold, Anything About WOW, Apr. 23, 2007. Retrieved from the internet: http://wowgolds.wordpress.com/2007/04/23/how-to-take-and-make-screenshots/ (accessed on Mar. 30, 2012). XP002672710.

Extended European Search Report with mail date of Mar. 30, 2012, re European Application No. 12151200.8 filed Jan. 16, 2012.

Ludwig et al., "XEP-0166: Jingle," XMPP Standards Foundation. pp. 1-53. Dec. 23, 2009.

Rosenberg, "Interactive Connectivity Establishment (ICE): A Protocol for Network Address Translator (NAT) Traversal for Offer/Answer Protocols," Internet Engineering Task Force (IETF). pp. 1-117, Apr. 2010.

Abd El-Sattar. A Novel Interactive Computer-Based Game Framework: From Design to Implementation. 2008 International Conference Visualisation [Online] 2008, pp. 123-128.

Blevins. Neverwinter Nights—PC Review at IGN—p. 2. http://pc.ign.com/articles/363/363038p2.html (accessed Aug. 12, 2011).

Haynes. Dead Space Review—Xbox 360 Review at IGN—pp. 2 & 3. http://xbox360.ign.com/articles/918/918892p2.html & http://xbox360.ign.com/articles/918/918892p3.html (accessed Aug. 12, 2011).

Hernandez et al. WeSketch: A 3D Real Time Collaborative Virtual Environment that Improves the GUI Sketching Task. 2011 Eighth International Conference on Information Technology: New Generations [Online] 2011.

Raskin. Graph Plus. PC Magazine [Online] 1989, V8, N17, p. 102(3).

Rowe et al. A Framework for Narrative Adaptation in Interactive Story-Based Learning Environments. Proceedings of the Intelligent Narrative Technologies III Workshop [Online] 2010.

Non-Final Office Action, Oct. 16, 2012, U.S. Appl. No. 13/008,854, filed Jan. 18, 2011.

Non-Final Office Action, Jun. 20, 2012, U.S. Appl. No. 13/342,185, filed Jan. 2, 2012.

Non-Final Office Action, Oct. 24, 2012, U.S. Appl. No. 13/342,185, filed Jan. 2, 2012.

Extended European Search Report, May 4, 2012, U.S. Appl. No. 11/006,996, filed Aug. 26, 2011.

Non-Final Office Action, Dec. 20, 2012, U.S. Appl. No. 12/869,615, filed Aug. 26, 2010.

Non-Final Office Action, Aug. 14, 2012, U.S. Appl. No. 13/191,321, filed Jul. 26, 2011.

Non-Final Office Action, Nov. 30, 2012, U.S. Appl. No. 13/536,941, filed Jun. 28, 2012.

Non-Final Office Action, Dec. 5, 2012, U.S. Appl. No. 13/536,943, filed Jun. 28, 2012.

Non-Final Office Action, Aug. 14, 2012, U.S. Appl. No. 13/467,867, filed May 9, 2012.

Non-Final Office Action, Oct. 22, 2012, U.S. Appl. No. 13/536,965, filed Jun. 28, 2012.

Non-Final Office Action, Aug. 16, 2012, U.S. Appl. No. 13/467,809, filed May 9, 2012.

Non-Final Office Action, Nov. 9, 2012, U.S. Appl. No. 13/555,049, filed Jul. 20, 2012.

Non-Final Office Action, Oct. 16, 2012, U.S. Appl. No. 13/536,971, filed Jun. 28, 2012.

Non-Final Office Action, Dec. 19, 2012, U.S. Appl. No. 13/538,674, filed Jun. 29, 2012.

Final Office Action, Dec. 21, 2012, U.S. Appl. No. 13/467,867, filed May 9, 2012.

Non-Final Office Action, Dec. 19, 2012, U.S. Appl. No. 13/558,158, filed Jul. 5, 2012.

Non-Final Office Action, Nov. 15, 2012, U.S. Appl. No. 13/549,375, filed Jul. 13, 2012.

Non-Final Office Action, Dec. 19, 2012, U.S. Appl. No. 13/538,757, filed Jun. 29, 2012.

Notice of Allowance, Feb. 21, 2013, U.S. Appl. No. 13/536,971, filed Jun. 28, 2012.

Non-Final Office Action, Jan. 24, 2013, U.S. Appl. No. 13/549,350, filed Jul. 13, 2012.

Notice of Allowance, Jan. 29, 2013, U.S. Appl. No. 13/563,677, filed Jul. 31, 2012.

Final Office Action, Feb. 26, 2013, U.S. Appl. No. 13/467,809, filed May 9, 2012.

Final Office Action, Feb. 20, 2013, U.S. Appl. No. 13/536,965, filed Jun. 28, 2012.

Final Office Action, Feb. 12, 2013, U.S. Appl. No. 13/191,321, filed Jul. 26, 2011.

Extended European Search Report, Dec. 3, 2012, 1270191.6, May 31, 2012.

Extended European Search Report, Jan. 8, 2013, 12170200.5, May 31, 2012.

Final Office Action, Mar. 1, 2013, U.S. Appl. No. 13/342,185, filed Jan. 2, 2012.

Int'l Search Report, Feb. 21, 2013, PCT/2012/20007, Jan. 2, 2012.

"Neverwinter Nights Platinum". Game Manual. Copyright 2004, Atari Interactive, Inc. 114 pages.

"Horse menu". Neverwinter Nights Wiki page. Retrieved Jun. 20, 2013 from URL <Http://nwnwikia.com/wiki/Horse_menu>. 2 pages.

"Counter Strike Manual" published on or before May 15, 2006, and retrieved Jun. 13, 2013 from URL <http://web.archive.org/web/20060515161034/http://voidclan.tripod.com/csmanual.htm>, 17 pages.

"Spectator FAQ" published on or before Nov. 11, 2011 and retrieved from URL <http://web.archive.org/web/20111110125011/http://na.leagueoflegends.com/spectator-faq>, 4 pages.

"Killcam Description for Call of Duty" published on or before Nov. 11, 2011 and retrieved from URL <http://web.archive.org/web20111126172904/http:/callofduty.wikia.com/wiki/Kilcam>, 7 pages.

"Counter-Strike" game description published on or before Nov. 21, 2010 and retrieved from URL <http://web.archive.org/web/20101121144545/http://en.wikipedia.org/wiki/Counter-Strike>, 6 pages.

"Official Rules of Baseball—2011 Edition". Major League Baseball. Feb. 16, 2011. Retrieved from the internet. Retrieved Jun. 1, 2013.

(56) References Cited

OTHER PUBLICATIONS

<URL:http://web.archive.org/web/20120112040330/http://mlb.mlb.com/mlb/official_info/official_rules/foreword.jsp>.
Murph, Darren. "Editorial: ESPN bypasses corporate red tape with iPad and Xbox 360, wannabe innovators should take note" Jun. 12, 2010. <http://www.engadget.com/2010/06/12/editorial-espn-bypasses-corporate-red-tape-with-ipad-and-xbox-3/>.
Point-HD Telestrator with Ipad. Retreived Jul. 12, 2013, <http://www.hdtelestrators.com/Ipad%20Telestrator.html>.
European Patent Office First Exam Report mailed Mar. 4, 2013 in application No. 11006996.0, filed Aug. 26, 2011.
Final, Jun. 24, 2013, U.S. Appl. No. 12/869,615, filed Aug. 26, 2010.
Final, Apr. 29, 2013, U.S. Appl. No. 13/008,854, filed Jan. 18, 2011.
Allowance, Jul. 5, 2013, U.S. Appl. No. 13/008,855, filed Jan. 19, 2011.
Final, May 30, 2013, U.S. Appl. No. 13/228,285, filed Sep. 8, 2011.
Non-Final, Jun. 5, 2013, U.S. Appl. No. 13/191,321, filed Jul. 26, 2011.
Final, Jun. 24, 2013, U.S. Appl. No. 13/538,674, filed Jun. 29, 2012.
Final, Jun. 18, 2013, U.S. Appl. No. 13/536,941, filed Jun. 28, 2012.
Final, Jun. 24, 2013, U.S. Appl. No. 13/536,943, filed Jun. 28, 2012.
Advisory, May 8, 2013, U.S. Appl. No. 13/342,185, filed Jan. 2, 2012.
Final, May 1, 2013, U.S. Appl. No. 13/536,965, filed Jun. 28, 2012.
Advisory, May 14, 2013, U.S. Appl. No. 13/467,809, filed May 9, 2012.
Allowance, Jun. 20, 2013, U.S. Appl. No. 13/467,809, filed May 9, 2012.
Non-Final, Apr. 22, 2013, U.S. Appl. No. 13/467,867, filed May 9, 2012.
Final, Apr. 18, 2013, U.S. Appl. No. 13/558,158, filed Jul. 5, 2012.
Advisory, Jul. 29, 2013, U.S. Appl. No. 13/558,158, filed Jul. 5, 2012.
Final, Apr. 25, 2013, U.S. Appl. No. 13/549,375, filed Jul. 13, 2012.
Advisory, Jul. 11, 2013, U.S. Appl. No. 13/549,375, filed Jul. 13, 2012.
Non-Final, Jun. 5, 2013, U.S. Appl. No. 13/555,049, filed Jul. 20, 2012.
Final, Jul. 17, 2013, U.S. Appl. No. 13/538,757, filed Jun. 29, 2012.
Non-Final, Jul. 17, 2013, U.S. Appl. No. 13/549,350, filed Jul. 13, 2012.
"Algemagorgic Non-Modal Context Menu," CodeGuru, May 22, 2004. retrieved from the internet: http://forums.codeguru.com/showthread.php?t=295801 (accessed on Apr. 27, 2012) XP002675225.
"Context Menu," Wikipedi, the free encyclopedia, Jun. 16, 2010. retrieved from the internet: http://en.wikipedia.org/w/index.php?title=Context_menu&oldid=368337587 (accessed on May 3, 2012) XP002675226.
"Maptool Concepts: The Next UI, Look, and Feel," RPTools.net, Feb. 2010. retrieved from the internet: http://forums.rptools.net/viewtopic.php?f=7&t=13178&sid=107ad2f90d833d6b5669fbeO3587b091&start=45 (accessed May 3, 2012) XP002675227.
"Pie Menu," Wikipedia, the free encyclopedia, Jul. 5, 2010. retrieved from the internet: http://en.wikipedia.org/w/index.php?title=Pie_menu&oldid=371797903 (accessed May 3, 2012) XP002675228.

"Modal Window," Wikipedia, the free encyclopedia, Aug. 18, 2010. retrieved from the internet: http://en.wikipedia.org/w/index.php?title=Modal_window&oldid=379626221 (accessed on May 3, 2012) XP002675229.
Extended European Search Report with mail date of May 4, 2012, re European Application No. 11006996.0 filed Aug. 26, 2011.
"CPUsage wants to harness idle computer power for others to use" written by O.K. Row, available on or before Jul. 2012 and retrieved from URL <http://www.oregonlive.com/small-business/index.ssf/2012/07/cpusage_wants_to_harness_idle.html>, 3 pages.
"CPUsage: Let Your PC Earn Money for You" written by Lambert Varias, available on or before Aug. 26, 2011 and retrieved from URL <http://technabob.com/blog/2011/08/26/cpusage-make-money-with-your-pc/>, 3 pages.
"Need cash? Forget plasma, and donate CPU time instead" written by Stacey Higginbotham, available on or before Jul. 11, 2011 and retrieved from URL <http://gigaom.com/cloud/need-cash-forget-plasma-and-donate-cpu-time-instead/>.
"Info on Points and Redemption" written by Jeff Martens, available on or before Jul. 20, 2011 and retrieved from URL<http://www.cpusage.com/blog/computer-owners/info-on-points-and-redemption/>, 1 page.
"Apr./May 2011 Admin Requirement Application—Europe." 13d.net. Online. Apr. 24, 2011. Accessed via the Internet. Accessed Nov. 8, 2012, <URL: http://forum.i3d.net/battefield-heroes-ranked-community-servers/170034-apr-may-2011-admin-requirement-application-europe.html#post1270013>.
BlamDarot, "Achievement Screenshotter", World of Warcraft Mod, Created Jul. 3, 2009, Last Updated Nov. 4, 2010, description accessed at http://wow.curseforge.com/addons/achievement-screenshotter on Feb. 15, 2013.
Rytych, "Game-like environments for nuclear engineering education using GECK", 1st International Nuclear & Renewable Energy Conference (INREC), pp. 1-5, IEEE, Mar. 2010.
Extended European Search Report with mail date of Dec. 3, 2012, re European Application No. 12170191.6 filed May 31, 2012.
Zhang, J. et al "WindTalker. A P2P-Based Low-Latency Anonymouns Communication Network," IEICE Transactions on Communications, Communications Society, Tokyo, JP, vol. E92B, No. 10, Oct. 1, 2009, pp. 3183-3194.
Extended European Search Report with mail date of Jan. 8, 2013, re European Application No. 12170200.5 filed May 31, 2012.
International Search Report mailed Feb. 21, 2013 in application No. PCT/US2012/20007, filed Jan. 12, 2012.
Bloviator, "America's Army Training Guide", www.gamefaqs.com, Online, Mar. 24, 2008, Accessed via the Internet Sep. 13, 2013, <URL: http://www.gamefaqs.com/pc/561551-americas-army/faqs/45333>.
Baset et al. "Reliability and Relay Selection in Peer to Peer Communication System", Dept. of Comp. Sci. Columbia University, NY, USA, 2010.
Intention to Grant dated Feb. 14, 2014 in European Patent Application No. 12170200.5, filed May 31, 2012.

* cited by examiner

SYSTEMS, METHODS AND MEDIA FOR DISTRIBUTING PEER-TO-PEER COMMUNICATIONS

FIELD OF THE INVENTION

The present technology relates generally to distributed computing, and more specifically, but not by way of limitation, to systems and methods for distributing peer-to-peer communications.

BACKGROUND

A cloud is a resource that typically combines the computational power of a large grouping of processors and/or that combines the storage capacity of a large grouping of computer memories or storage devices. For example, systems that provide a cloud resource may be utilized exclusively by their owners, or such systems may be accessible to outside users who deploy applications within the computing infrastructure to obtain the benefit of large computational or storage resources.

The cloud may be formed, for example, by a network of servers with each server providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

SUMMARY OF THE INVENTION

Systems and methods of the present technology are directed to distributed computing. In some embodiments, the systems and methods provided herein may be directed to distributing peer-to-peer communications over communications channels of a peer-to-peer communications network. The systems and methods may facilitate peer-to-peer communications within the context of a web based application, wherein a plurality of client nodes communicate with one another while interacting with the web based application. It will be understood that the web based application may reside within a data-center or cloud. For example, a plurality of gamers (client nodes) may chat with one another via a communications channel of a web based program, such as a multiplayer online videogame, while also individually interacting with the videogame.

To reduce operational cost of the data-center and reduce the workload of the same, client nodes may donate a portion of their computing resources to the data-center to facilitate peer-to-peer communications of other client nodes over the peer-to-peer network. According to some embodiments, the computing resources may include network bandwidth, and in other embodiments, CPU capacity. Client nodes that donate their computing resources to the data-center may hereinafter be referred to as a proxy node.

When the systems and methods receive requests to establish a communications channel (e.g., client nodes attempting to communicate with one another), proxy nodes are selected and added to the communications channel. The systems and methods may select the proxy nodes from a list of potential proxies. In an effort to increase the security of peer-to-peer communications, the systems and methods direct client nodes through the proxy nodes to mask the identities of the client nodes. Additionally, the proxy nodes that are selected may include disinterested client nodes. Disinterested client nodes may include client nodes that have no relationship to the client nodes that are currently operating on the communications channel. It will be understood that a disinterested client node may include a node located remotely from the client nodes that are currently communicating with one another. Disinterested client nodes may also include nodes that have never communicated with the client nodes that are currently communicating with one another.

The present technology leverages the computational resources of distributed computing (e.g., cloud computing systems) to facilitate efficient peer-to-peer communications. In distinction to common cloud systems that include only web servers, the systems of the present technology may create ad hoc clouds that include a plurality of end user computing devices. These end user computing devices allocate a portion of the resources to facilitate the distribution of peer-to-peer communication between end user computing devices.

According to some embodiments, the present technology may be directed to methods for distributing peer-to-peer communications that includes masking identification of two or more client nodes on a communications channel of a peer-to-peer communications network by directing peer-to-peer communications of the two or more client nodes through a proxy node, the proxy node including a disinterested client node relative to the two or more client nodes, the disinterested client node providing network resources to the peer-to-peer communications network.

According to other embodiments, the present technology may be directed to system for distributing peer-to-peer communications that include: (a) a memory for storing executable instructions for distributing peer-to-peer communications; and (b) a processor configured to execute the instructions stored in the memory, the executable instructions including: (i) a proxy manager configured to mask identification two or more client nodes on a communications channel of the peer-to-peer communications network by directing peer-to-peer communications of the two or more client nodes through a proxy node, the proxy node including a disinterested client node relative to the two or more client nodes, the disinterested client node providing network resources to the peer-to-peer communications network.

According to additional embodiments, the present technology may be directed to non-transitory computer readable storage media having a computer program embodied thereon. The computer program may be executable by a processor in a computing system to perform a method for distributing peer-to-peer communications that includes masking identification of two or more client nodes on a communications channel of a peer-to-peer communications network by directing peer-to-peer communications of the two or more client nodes through a proxy node, the proxy node including a disinterested client node relative to the two or more client nodes, the disinterested client node providing network resources to the peer-to-peer communications network.

DETAILED DESCRIPTION OF EXEMPLARY EMBODIMENTS

Figure 1:
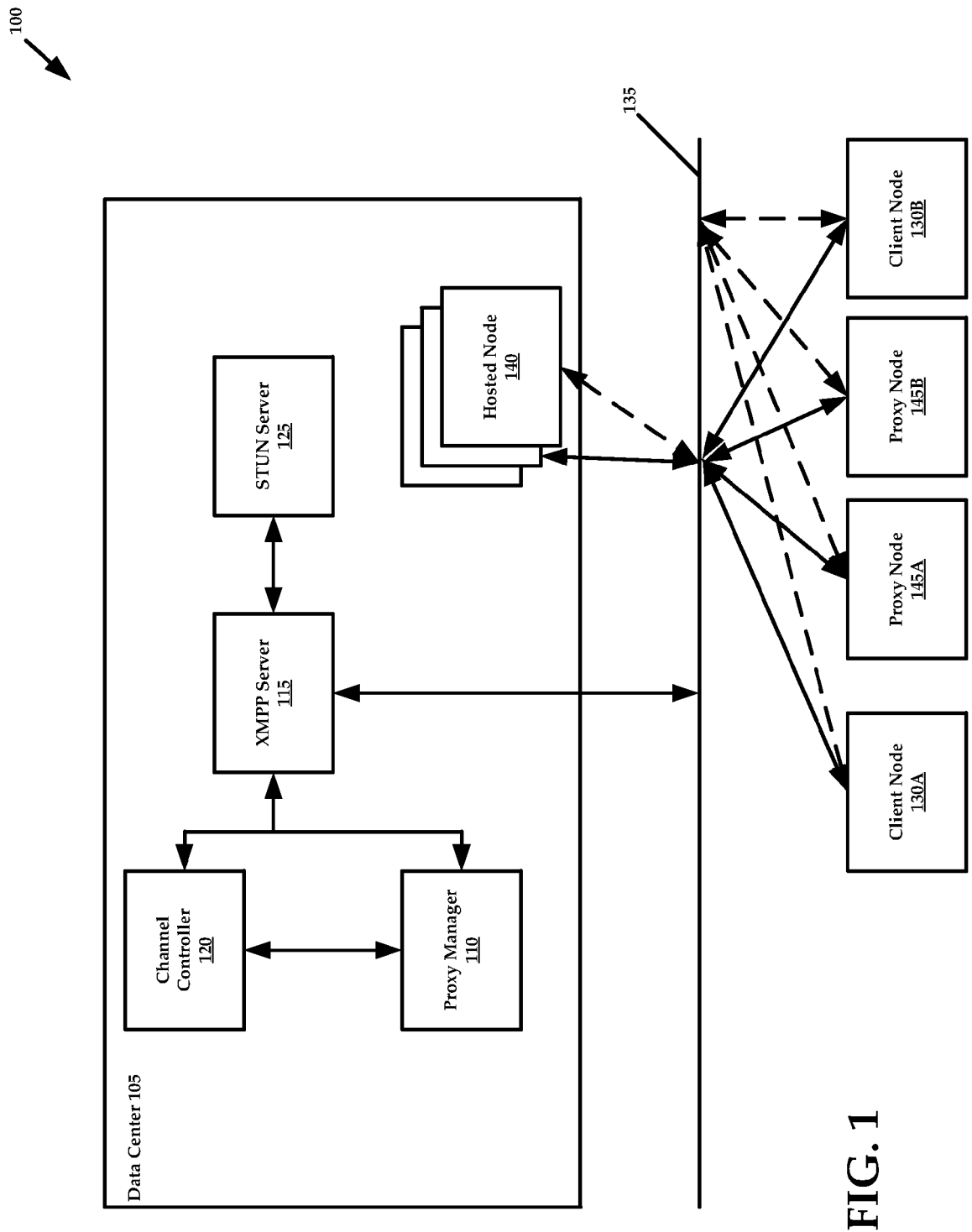
FIG. 1 illustrates an exemplary peer-to-peer communications network for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

Generally speaking, the systems and methods of the present technology may be directed to distributing peer-to-peer communications. More specifically, the systems and methods provided herein may be configured to distribute peer-to-peer voice over Internet protocol (VoIP) communications. In some embodiments, the peer-to-peer voice over Internet protocol (VoIP) communications may be distributed to proxy nodes that have allocated their resources (e.g., network bandwidth, CPU capacity, etc.) to a data-center, such as a cloud computing system.

In a cloud environment, the individual components (e.g., computing devices) of the cloud allocate their individual resources to the cloud. The resources are generally employed by the cloud to facilitate the operation (e.g., workload) of one or more web based applications, or other ancillary functions associated with the web based application. Therefore, the combined resources of the cloud that enable the web based application are greater than the resources of the individual computing systems that comprise the cloud. In some embodiments, the web based application or program may include a multiplayer videogame, although other types of web based applications or programs that would be known to one of ordinary skill in the art with the present disclosure before them are likewise contemplated for use in accordance with the present disclosure. It will be understood that the web based application may also be distributed within the cloud.

Therefore, in some embodiments, web servers that facilitate the web based application may cooperate to form a first data center or cloud, and the client devices that allocate resources to the web server that facilitate the web based application may form a second data center or cloud.

FIG. 1 illustrates an exemplary peer-to-peer communications network, hereinafter referred to as network 100 for practicing aspects of the present technology. The network 100 is shown as including a data center 105 or cloud that includes a proxy manager module 110, an XMPP server 115, one or more channel controller modules 120, and a STUN server 125. It will be understood that the enumerated components of the network 100 may be communicatively coupled to one another via at least one of a public or private communications network (not shown) such as a local area network (LAN), a wide area network (WAN), a virtual private network (VPN), the Internet, and combinations thereof.

It is noteworthy that the data center 105 may include additional modules, engines, or components, and still fall within the scope of the present technology. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionality.

In addition to the data center 105, the network 100 may include a plurality of client nodes. For the sake of brevity, client nodes have been shown as including two client nodes 130A and 130B, although one of ordinary skill in the art will appreciate that the network 100 may facilitate any number of client nodes. It will be understood that each of the elements of FIGS. 1-4 may be understood to include one or more of the specified elements. For example, the two client nodes 130A and 130B may include any number of client nodes. Therefore, FIGS. 1-4 are merely exemplary illustrations and do not limit the scope of the present technology.

Broadly speaking, client nodes include end user computing devices (e.g., computing systems) that are utilized by end users to communicate with one another via one or more peer-to-peer communications channels, hereinafter referred to as communications channel 135.

Individual communications channels (e.g., voice channels) for each client node 130A and 130B may be multiplexed into the communications channels 135.

Generally speaking, client nodes are the final end-point of any peer-to-peer communications channel, such as a voice stream. Proxy nodes act as communication intermediaries between two or more client nodes and serve to isolate knowledge about the IP addresses of other client nodes. That is, proxy nodes may be configured to mask the IP addresses of client devices utilizing a communications channel 135. Isolating knowledge of the IP addresses of client nodes from other client nodes may prevent malicious actions from client nodes against other client nodes. Non-limiting examples of malicious attacks may include denial-of-service (DOS) attacks, IP address harvesting, and so forth. Additionally, the proxy nodes may serve as a multicast exploder for point-to-multipoint communications.

Moreover, the proxy nodes selected for a communications channel 135 by the network 100 may be disinterested client nodes. That is, the client nodes selected as proxy nodes by the network 100 may not have any relationship with the end point client nodes of a communications channel 135. This separation of client nodes and proxy nodes may reduce the likelihood that a client device that is selected as a proxy node may intentionally interfere (e.g., greifing, IP harvesting, etc.) with peer-to-peer communications between the end point client nodes.

As stated before, the client nodes may each dedicate a portion of their computing resources to the data center 105 to facilitate peer-to-peer communications between client nodes. With respect to peer-to-peer communications, the computing resources that are dedicated to the network 100 may include a portion of the network bandwidth of individual client nodes. Exemplary proxy nodes may include proxy nodes 145A and 145B, although as with client nodes 130A and 130B, one of ordinary skill in the art will appreciate that the network 100 may facilitate any number of proxy nodes.

Figure 2:
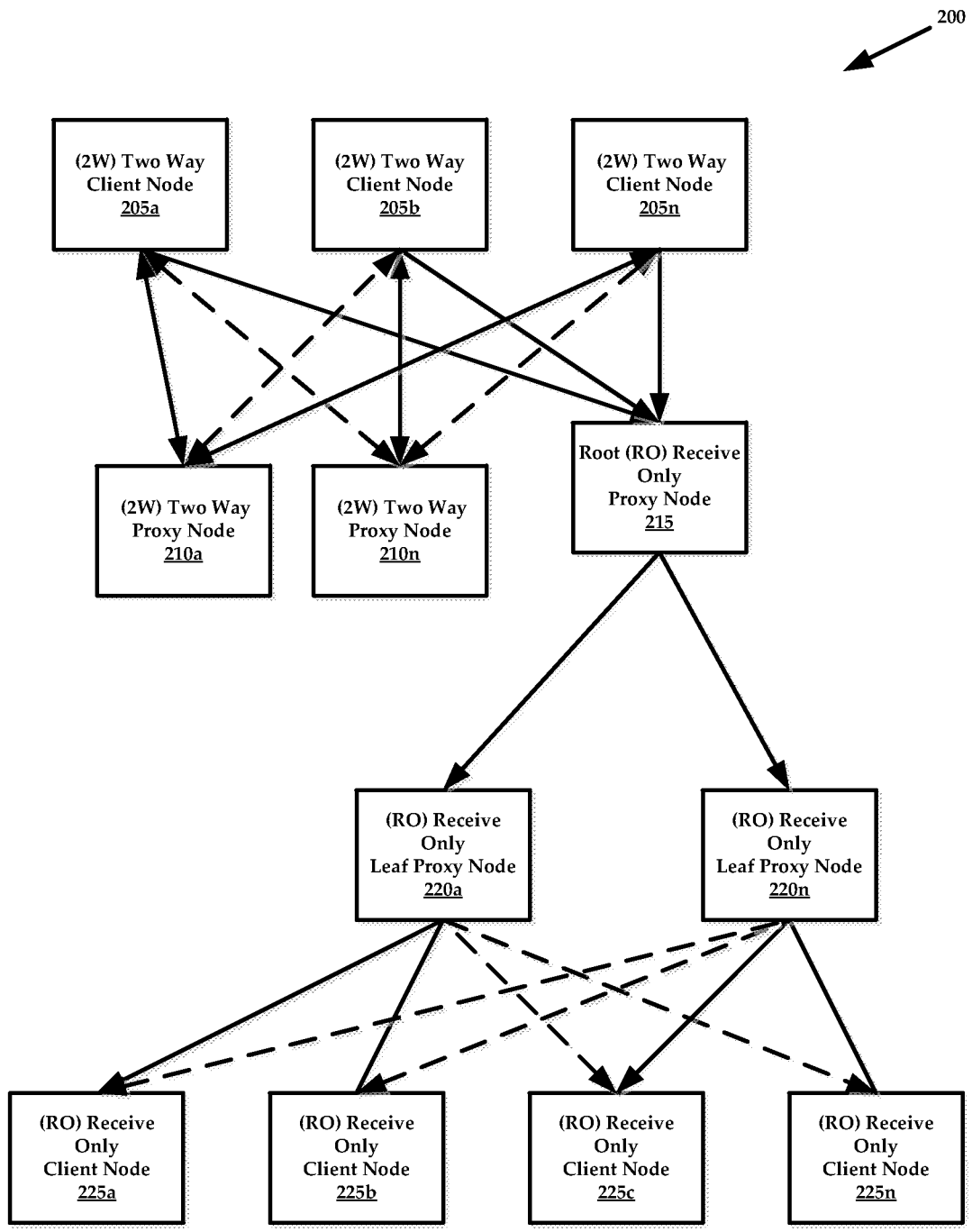
FIG. 2 illustrates an exemplary node communications distribution tree.

FIG. 2 illustrates an exemplary node communications distribution tree 200 showing communications between various types of nodes. It will be understood that the solid lines indicate primary communication streams and dotted lines are indicative of backup communication streams. Communication streams may also be described as tunnels, channels, ports, and so forth.

More specifically, client nodes may be broadly categorized as two-way (2W) client nodes 205$a$-$n$ and receive-only (RO) client nodes 225$a$-$n$. Proxy nodes may be broadly categorized as two-way (2W) proxy nodes 210$a$-$n$, root RO proxy nodes 215, and RO leaf proxy nodes 220$a$-$n$. 2W client nodes 205$a$-$n$ may receive communication streams from all the other 2W client nodes 205$a$-$n$ via the 2W proxy nodes 210$a$-

*n*, but may not receive communication streams from other RO client nodes 225*a-n*. 2W client nodes 205*a-n* may expect that their data packets may be received by other 2W client nodes 205*a-n* via the 2W proxy nodes 210*a-n*, and other RO client nodes 225*a-n* via the root RO proxy nodes 215 and RO leaf proxy nodes 220*a-n*.

In some embodiments, RO client nodes 225*a-n* receive communication streams from all the other 2W client nodes 205*a-n* via the root RO proxy nodes 215 and RO leaf proxy nodes 220*a-n*, but may not receive communication streams from other RO client nodes 225*a-n*.

Root RO proxy nodes 215 may be hosted nodes 140 (described in greater detail below) and may not be backed up. That is, there may not be an auxiliary node to the hosted node 140. Hosted nodes 140 will be discussed in greater detail below. Therefore, a hosted node 140 may be allocated per communication channel 135. In some embodiments, 2W proxy nodes 210*a-n* and RO leaf proxy nodes 220*a-n* may be regular client nodes, so when they are in use, at least two 2W proxy nodes (e.g., proxy nodes 145A and 145B in FIG. 1) may be allocated per communication channel 135 to provide redundancy in the event that one of the proxy nodes 145A or 145B fails. Failure of a proxy node may include the proxy node leaving the communications channel 135.

An "allocate" message received from a proxy node may indicate whether the proxy node is part of the 2W or RO distribution tree. This may determine the type of upstream and downstream nodes that are allocated to this proxy node and the exact operation of the in-band UDP protocol.

Additionally, the network 100 may maintain a quick switch list of potential proxy nodes that may be utilized by the network to replace a failing proxy node.

With regard to communications between various types of proxy nodes and client nodes, a 2W proxy node such as 210*a* may establish tunnels (see solid and dotted lines of FIG. 2) with all 2W client nodes 205*a-n*, in the communications channel 135. The 2W proxy node 210*a* may utilize a list of client proxies received from the channel controller module 120 to select a root RO proxy node 215. As stated previously, a root RO proxy node 215 may be either a root node or leaf node. A root RO proxy node 215 may create tunnels to all 2W client nodes 205*a-n* and to all RO leaf proxy nodes 220*a-n* in the communications channel 135.

The RO leaf proxy nodes 220*a-n* may be referred to as the "children" of the root RO proxy node 215. The root RO proxy node 215 may forward all packets from all the 2W client nodes 205*a-n* to all RO leaf proxy nodes 220*a-n* with active downstream RO client nodes 225*a-n*. The list of 2W client nodes 205*a-n* associated with a particular proxy node may be indicated from "update" messages and "sync" messages received by the nodes from the channel controller module 120.

Each RO leaf proxy node 220*a-n* may maintain tunnels with a limited set of RO client nodes 225*a-n*. The list of RO client nodes 225*a-n* associated with a particular RO leaf proxy node 220*a-n* may be indicated by "update" messages and the "sync" messages received by the nodes from the channel controller module 120.

Additionally, certain nodes in the data center 105 may be designated as hosted nodes 140. Hosted nodes 140 allocate their resources to the data-center 105, but in contrast with other nodes, hosted nodes 140 are expected to be continually accessible to the client nodes (as opposed to proxy nodes which may be intermittently available) and be directly addressable on the Internet (i.e., not via a NAT router). Hosted nodes 140 normally reside in the data-center 105 and may be utilized as either 2W or RO proxy nodes.

In some embodiments, the hosted nodes 140 are configured to bootstrap the network during the early phases of the creation of a communications channel 135 when insufficient regular proxy nodes may not be available. Additionally, hosted nodes 140 may provide backup or "fallback" service between two client nodes with incompatible NAT or firewall implementations.

As described above, the network 100 may utilize many types of nodes. Therefore, unless specifically noted, the term "nodes" may be understood to include all types of nodes previously described, such as proxy, client, host, and the like.

Turning again to FIG. 1, the proxy manager module 110 may track nodes that are currently active in the network 100, along with various state variables associated with each of the active nodes. These state variables may include IP address information and available network bandwidth data. The proxy manager module 110 may be responsible for the allocation of nodes to various peer-to-peer functions, such as voice proxies, grid compute nodes, and so forth.

In addition, the proxy manager module 110 may be configured to track the presence of the nodes accessing the one or more peer-to-peer communications channels 135 and providing notification to other network 100 components when an allocated proxy node becomes unavailable. It will be understood that communications with the proxy manager module 110 via client nodes or other service elements may be facilitated through XMPP messages routed through the XMPP server 115.

In some embodiments, the proxy manager module 110 may be implemented as a standard Jabber external component according to the (XEP-114) Jabber component protocol. In other embodiments, the proxy manager module 110 may be combined with the XMPP server 115 on the same node within the data center 105. In additional applications, to facilitate greater scalability, the proxy manager module 110 may reside on a distinct cluster of nodes (e.g., web servers) within the data center 105.

The XMPP server 115 (aka Jabber server) may serve as the communications bus for signaling messages among the data-center-resident functions, and between the data-center-resident functions and the nodes. Nodes may be authenticated to the XMPP server 115 by an interface to the web based application resident within the data center (e.g., a multiplayer videogame). Except for a custom interface with the web based application, the XMPP server 115 may operate per the XMPP specification (RFC-3920) protocol.

According to the present technology, the channel controller module 120 may be responsible for setup and management of the one or more peer-to-peer communications channels 135. The channel controller module 120 may send and receive XMPP protocol messages from client nodes via the XMPP server 115. These messages may be utilized to control the overall operation of each voice channel (e.g., tunnel) established for each client node. Additionally, the channel controller module 120 may interact with the proxy manager module 110 via the XMPP server 115 to allocate proxy nodes or grid compute nodes (not shown). The grid compute nodes may include client nodes that dedicate CPU capacity to the network 100 in addition to other computing resources.

According to some embodiments, the nodes may utilize the STUN server 125 to determine certain information about their network address translation (NAT) configuration needed to implement the Interactive Connectivity Establishment (ICE) protocol.

In some embodiments, the network 100 may utilize communication protocols, such as Jingle (XEP-166) protocol, although one of ordinary skill in the art will appreciate that many other types of communication protocols may likewise be utilized in accordance with the present invention.

More specifically, in some applications, two classes of protocol messages may be utilized within the network 100, an XMPP-based message protocol for communication channel setup and maintenance, and a UDP-based peer-to-peer protocol for real-time communication channel control and communication channel data transport. XMPP-based messages between the components of the network 100 may be routed through the XMPP server 115. UDP-based communications may be routed directly between client nodes and proxy nodes.

Each end user may be uniquely identified within the network 100 via a unique identification such as a username. Each username may be globally unique to the network 100. In some embodiments, the username may be represented as a UTF-8 encoded Unicode string. When the user logs in to the web based application (not show), the user (e.g., client node) may be assigned a Jabber ID (JID). It will be understood that the format of a JID is defined in (RFC-3920), although one of ordinary skill in the art will appreciate that many other types of identification protocols may likewise be utilized in accordance with the present invention.

It will be understood that the combination of username and domain parts of the JID is globally unique. As such, individual nodes may be uniquely identified via their JID. According to some embodiments, the format of the JID domain part may include a format such as xxxx.voip.domain.com, where xxxx is a sub-domain used to provide another level of scaling for the network server infrastructure.

Each user is assumed to be logged in to the web based application no more than once, so their JID may also be used as a transient unique identifier of the client node on which the user is currently running an instance of the web based application.

According to some embodiments, the nodes may interact directly with both the channel controller module 120 and the proxy manager module 110 using peer-to-server XML protocol messages. Messages between the channel controller module 120 and nodes may be used to manage a node's membership and role within a communications channel, such as communications channel 135. Messages between the proxy manager module 110 and individual nodes may be utilized to manage a node's availability to be a proxy node. In addition, the proxy manager module 110 and the channel controller module 120 may interact with each other directly using inter-server XML protocol messages. In addition, the proxy manager module 110 and the channel controller module 120 may interact with each other directly using inter-server XML protocol messages.

In operation, a node may be added to a communications channel 135 by sending an "add client" message to the channel controller module 120. It will be understood that the addition of a first client node or proxy node to a new channel may cause the channel controller module 120 to auto-create a communications channel 135. Once established, the proxy manager module 110 may add proxy nodes (e.g., proxy nodes 145A and 145B) to the communications channel 135.

To join a communications channel 135, a client node logs into the XMPP server 115 using their JID, as described above. The network 100 may issue the node a password based on a ticket obtained when the client node logs into the web based application. After login is completed, the client node sends a directed presence message to the proxy manager module 110. The proxy manager module 110 may use this directed presence message as an indication that this particular client node is available for use as a proxy node. The directed presence message may also include allocated resource data that corresponds to the network bandwidth that the client node is making available to the network 100.

The client node may send these directed presence messages periodically. For example, directed presence messages may be sent at thirty second intervals, although other interval times may likewise be utilized in accordance with the present technology.

Entering and Exiting of Client Nodes from a Communications Channel

According to some embodiments, a client node may be invited to a communications channel 135. This invitation is triggered by the delivery of a "add client" event message to the channel controller module 120. This event message may indicate whether the client node is two-way or receive-only. This will determine the type of upstream proxy nodes allocated to this client node and the operation of the in-band user datagram protocol (UDP) protocol.

When the channel controller module 120 receives an "add client" event, the channel controller may send an XMPP IQ message containing an invitation element to the JID of that client node. The client node may respond with either an "accept" or "reject" message. If the invitation was accepted, the channel controller module 120 may send "update" messages to the other nodes of the communications channel 135, both client and proxy. In addition, the channel controller module 120 may send the new client node an initial "sync" message with information needed to establish peer-to-peer communications with the other clients and proxies.

After the client node has received the first "sync" message, the client node may utilize ICE channel setup algorithms.

It will be understood that each communications channel 135 may contain multiple proxy nodes. The client node may maintain active open tunnels to all proxy nodes in according to the "sync" data received from the channel controller module 120, although data packets may generally forwarded through the highest priority proxy with sufficient quality of service.

A "sync" message from the channel controller module 120 to a client node may contain a list of JIDs and NodeIDs of the other client nodes in the channel. It will also contain a list of node JIDs and IP rendezvous information for each proxy node assigned to the client node.

After a client node receives a "sync" message, changes to channel membership and proxy node allocation are signaled with incoming "update" messages relative to membership and current proxy nodes, such as information about client nodes and proxy nodes being added or removed from the communications channel 135. Each "update" message may contain a sequence number. If the client node determines a gap in the sequence numbers, this indicates loss of an update message. In that case, the client may send a "sync" request message to the channel controller module 120 that may cause the channel controller module 120 to send a new, up-to-date "sync" message to the client node. The sequence number space may be distinct for each "update" message type to each client node. Therefore, a client node and the channel controller module 120 may maintain separate states for each node/message-type tuple.

The channel controller module 120 may also send an "update" message to all client nodes whenever a client node is added to (or dropped from) the communications channel 135. Update messages may also contain a list of the client node IDs (JIDs) and related list of candidate IP endpoint data for each proxy node assigned to it. The channel controller module 120 may also send an "update" proxy message to all clients whenever a proxy node is added to or dropped from the communications channel 135

A client node may voluntarily leave, or be forced from the communications channel 135. In either case, a "drop client" event is communicated to the channel controller module 120. As with "add client" events, the "drop client" events may include the communication of an XMPP IQ message to the channel controller module 120. Upon receipt of a "drop client" message, the channel controller module 120 may send a "hangup" message to the client node and appropriate "update" messages to the other client nodes and proxy nodes on the communications channel 135. The dropped client node then acknowledges the "hangup" message and is no longer considered to be in the group.

Entering and Exiting of Proxy Nodes from a Communications Channel

A proxy node may enter the communications channel 135 based upon a request by the channel controller module 120 and a selection of the proxy node by the proxy manager module 110. In some embodiments, the proxy manager module 110 may select disinterested proxy nodes based upon the JIDs of the client nodes that are associated with the communications channel 135.

The channel controller module 120 may obtain a list of potential proxy nodes from the proxy manager module 110, as described above. The channel controller module 120 may then send an "allocate" message to each of the potential proxy nodes. Each of the potential proxy nodes may respond to the "allocate" message with either an "accept" or a "reject" message.

After a proxy node has been added to the communications channel 135, the channel controller module 120 may decide to drop a proxy node based upon non-use or the quality of service provided by a proxy node falling below a threshold amount. A quality of service may include an actual amount of network bandwidth that a proxy node is dedicating to the network 100. It will be understood that a network administrator may establish the threshold amount of bandwidth for each proxy node.

Once such a determination has been made, the channel controller module 120 may send a "hangup" message to the proxy node and appropriate "update" messages to the client nodes of the communications channel 135. The dropped proxy node then acknowledges the "hangup" message and is no longer considered to be in the group. If client nodes still remain in the group, the channel controller module 120 may allocate one or more additional proxy nodes to replace the removed proxy node.

If a node becomes unavailable for use as a proxy, it should either totally disconnect from the XMPP server 115 (which will also remove it from voice channel interaction as a client node) or send a directed XMPP presence message to the proxy manager 110 with an "unavailable" status message. It will be understood that the node may still act in the role of a client node.

The departure of the last client node from the communications channel 135 will trigger the channel controller module 120 to auto-destroy or close the communications channel 135. To prevent thrashing due to short term conditions, the channel controller module 120 may utilize a linger timer after the last client node departs before closing the communications channel 135. In some embodiments, the linger time may be thirty seconds, although other linger times may likewise be utilized in accordance with the present technology.

Figure 3:
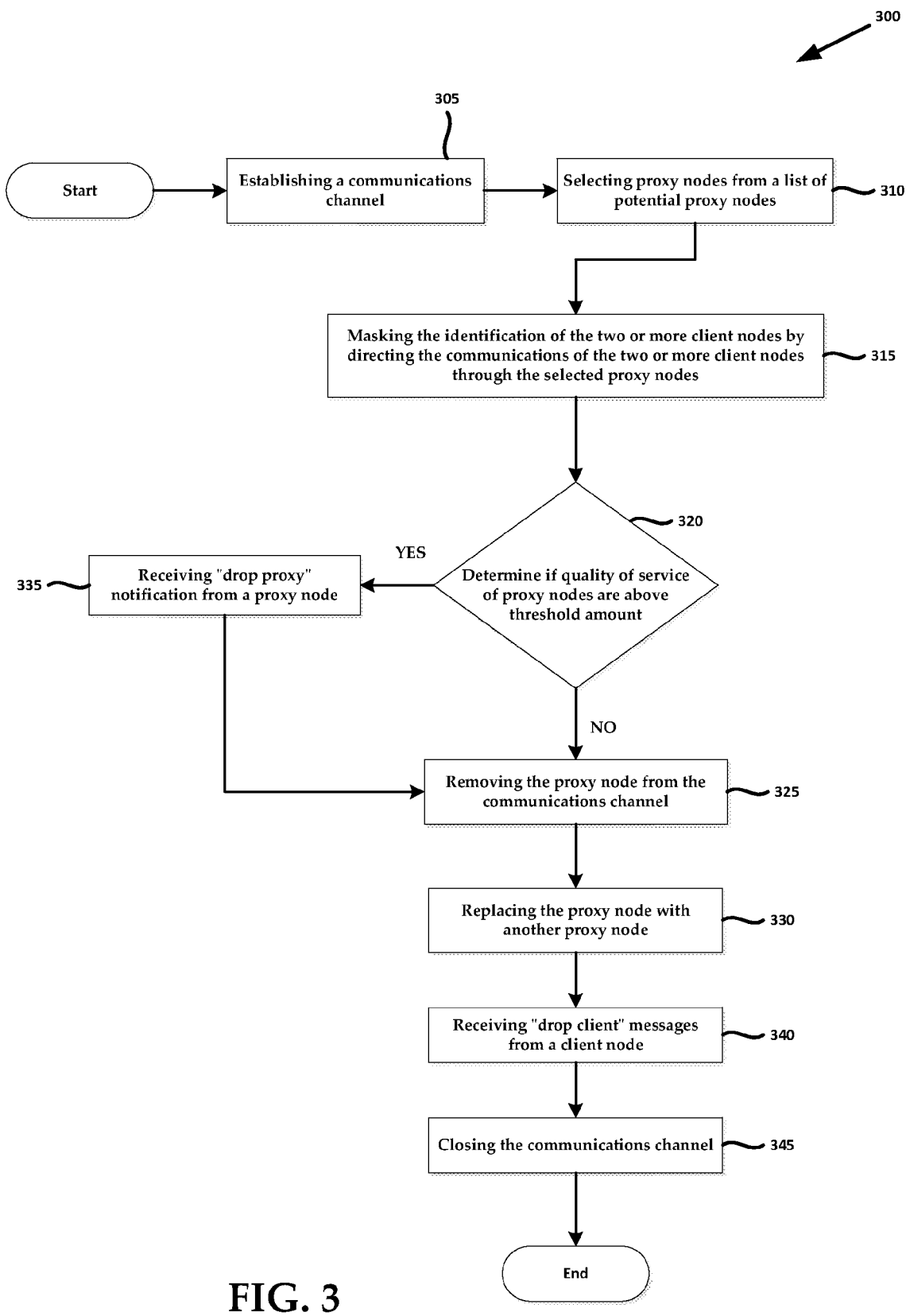
FIG. 3 illustrates a flow diagram of an exemplary method for distributing peer-to-peer communications.

FIG. 3 illustrates a flow chart of an exemplary method 300 for distributing peer-to-peer communications. The method 300 may include step 305 of establishing a communications channel of a peer-to-peer network in response to receiving an "add client" request from two or more client nodes. As stated previously, each client node (and subsequently added proxy or hosted nodes) may include a unique JID that is utilized by the network to monitor communications from the nodes on the communications channel.

Next, the method includes step 310 of selecting proxy nodes from a list of potential proxy nodes. The proxy nodes that are selected in step 310 may include disinterested client nodes relative to the two or more client nodes from which "add client" requests were received. Selecting disinterested client nodes may be facilitated by comparing the JID of each client node against the potential proxy node included in the list of potential proxy nodes. The step 310 may include determining an amount of proxy nodes required by determining the amount of client nodes that are utilizing the communications channel. As the number of client nodes increase, the amount of proxy nodes may increase as well.

As stated above, disinterested client nodes may include client nodes with which the two or more client nodes have never communicated. After proxy nodes have been selected, the method includes step 315 of masking the identification of the two or more client nodes by directing the communications of the two or more client nodes through the selected proxy nodes.

Next, the method includes step 320 of monitoring the quality of service of the proxy nodes to determine if quality of service of the proxy nodes are above a threshold amount. For example, the network may monitor the actual network bandwidth that a proxy node is allocating to the network.

If the quality of service of a proxy node is below the threshold amount, the method may include step 325 of removing the proxy node from the communications channel followed by step 330 of replacing the proxy node with another proxy node from the list of potential proxy nodes. The network may send updated proxy data to the nodes of the communications channel indicating the change with the proxy node.

If the quality of service of a proxy node is at or above the threshold amount, the network may continue to use the proxy node until the network receives "drop proxy" notification from a proxy node that indicates to the network that the proxy node is leaving the communications channel in step 335. Upon receiving the "drop proxy" from the proxy node that the proxy node is leaving the communications channel, the method may be directed to step 325 to remove the proxy node from the communications channel followed by step 330 of replacing the proxy node with another proxy node from the list of potential proxy nodes.

The method 300 may also include the step 340 of receiving "drop client" messages from a client node that the client node is leaving the communications channel. Upon the client node leaving the communications channel, the network may send updated client node messages to the remaining nodes of the communications channel that indicate that the client node is no longer utilizing the communications channel.

Upon the last client node leaving the communications channel, the method 300 includes the step 345 of closing the communications channel.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Figure 4:
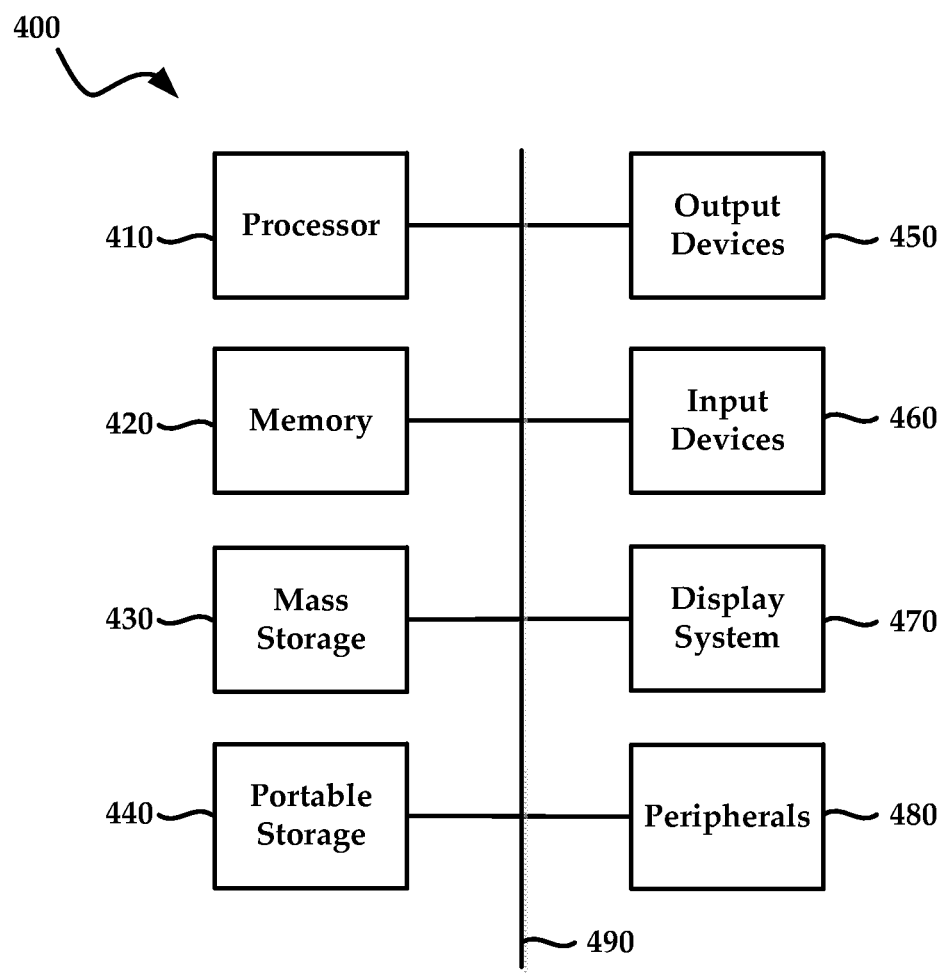
FIG. 4 is a block diagram of an exemplary computing system that may be utilized to practice aspects of the present disclosure.

FIG. 4 illustrates an exemplary computing system 400 that may be used to implement an embodiment of the present technology. Any of the enumerated components of network 100 may include one or more of the components of computing system 400. The computing system 400 of FIG. 4 includes one or more processors 410 and memory 420. Memory 420 stores, in part, instructions and data for execution by processor 410. Memory 420 can store the executable code when the system 400 is in operation. The system 400 of FIG. 4 may further include a mass storage device 430, portable storage medium drive(s) 440, output devices 450, user input devices 460, a graphics display 470, and other peripheral devices 480.

The components shown in FIG. 4 are depicted as being connected via a single bus 490. The components may be connected through one or more data transport means. Processor 410 and memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present technology for purposes of loading that software into memory 420.

Portable storage device 440 operates in conjunction with a portable non-volatile storage medium, such as a floppy disk, compact disk or digital video disc, to input and output data and code to and from the computing system 400 of FIG. 4. The system software for implementing embodiments of the present technology may be stored on such a portable medium and input to the computing system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripheral devices 480 may include any type of computer support device to add additional functionality to the computing system. Peripheral device(s) 480 may include a modem or a router.

The components contained in the computing system 400 of FIG. 4 are those typically found in computing systems that may be suitable for use with embodiments of the present technology and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method for distributing peer-to-peer communications, comprising:
    establishing a communications channel for an amount of client nodes;
    determining an amount of proxy nodes required for the communications channel based upon the amount of client nodes;
    evaluating a list of potential proxy nodes available to a peer-to-peer communications network;
    comparing an Internet protocol (IP) address of each of the potential proxy nodes and an IP address of two or more client nodes to determine one or more disinterested proxy nodes;
    selecting a proxy node from the one or more disinterested proxy nodes;
    masking identification of the two or more client nodes on a communications channel of a peer-to-peer communications network by directing peer-to-peer communications of the two or more client nodes through the selected proxy node, the selected proxy node including a disinterested client node relative to the two or more client nodes, the disinterested client node providing network resources to the peer-to-peer communications network; and selecting an additional proxy node from a quick switch list of potential proxy nodes upon determining failure of the selected proxy node, the additional proxy node also including a disinterested client node relative to the two or more client nodes.

2. The method according to claim 1, wherein the disinterested client node includes a client node with which the two or more client nodes have never previously communicated.

3. The method according to claim 1, wherein the peer-to-peer communications network includes a voice over Internet protocol (VoIP) communications network.

4. The method according to claim 1, wherein the disinterested proxy node includes a hosted node of the peer-to-peer communications network.

5. The method according to claim 1, wherein the proxy node may be utilized for two or more different communications channels.

6. The method according to claim 1, wherein failure includes a quality of service for the proxy node being below a threshold amount.

7. The method according to claim 6, wherein the quality of service for the proxy node includes a current amount of network bandwidth being made available to the peer-to-peer communications network.

8. A system for distributing peer-to-peer communications, comprising:

a memory for storing executable instructions for distributing peer-to-peer communications; and a processor configured to execute the instructions stored in the memory, the executable instructions including:

a channel controller module configured to:
establish a communications channel for an amount of client nodes, and
determine an amount of proxy nodes required for the communications channel based upon the amount of client nodes; and a proxy manager module configured to:
evaluate a list of potential proxy nodes available to the peer-to-peer communications network,
compare an Internet protocol (IP) address of each of the potential proxy nodes and an IP address of the two or more client nodes to determine one or more disinterested proxy nodes,
select at least one proxy node from the one or more disinterested proxy nodes,
mask identification of the two or more client nodes on a communications channel of a peer-to-peer communications network by directing peer-to-peer communications of the two or more client nodes through the at least one proxy node, the at least one proxy node including a disinterested client node relative to the two or more client nodes, the disinterested client node providing network resources to the peer-to-peer communications network, and
select an additional proxy node upon the channel controller module determining failure of a proxy node, the additional proxy node also including a disinterested client node relative to the two or more client nodes.

9. The system according to claim 8, wherein failure includes a quality of service for the proxy node being below a threshold amount.

10. The system according to claim 8, wherein the disinterested client node includes a client node with which the two or more client nodes have never previously communicated.

11. The system according to claim 8, wherein the peer-to-peer communications network includes a voice over Internet protocol (VoIP) communications network.

12. The system according to claim 8, wherein the disinterested proxy node includes a hosted node of the peer-to-peer communications network.

13. The system according to claim 8, wherein the proxy manager module may utilize a proxy node for two or more different communications channels.

14. A non-transitory computer readable storage medium having a computer program embodied thereon, the computer program executable by a processor in a computing system to perform a method for distributing peer-to-peer communications, the method comprising:

establishing a communications channel for an amount of client nodes;

determining an amount of proxy nodes required for the communications channel based upon the amount of client nodes;

evaluating a list of potential proxy nodes available to the peer-to-peer communications network;

comparing an Internet protocol (IP) address of each of the potential proxy nodes and an IP address of two or more client nodes to determine one or more disinterested proxy nodes;

selecting at least one proxy node from the one or more disinterested proxy nodes;

masking identification of the two or more client nodes on a communications channel of a peer-to-peer communications network by directing peer-to-peer communications of the two or more client nodes through the selected at least one proxy node, the selected at least one proxy node including a disinterested client node relative to the two or more client nodes, the disinterested client node providing network resources to the peer-to-peer communications network; and selecting an additional proxy node from a quick switch list of potential proxy nodes upon determining failure of a proxy node, the additional proxy node also including a disinterested client node relative to the two or more client nodes.

* * * * *